(12) United States Patent
Ikeyama et al.

(10) Patent No.: US 8,134,611 B2
(45) Date of Patent: Mar. 13, 2012

(54) IMAGE PROCESSOR, IMAGE PROCESSING METHOD AND RECORDING MEDIUM

(75) Inventors: Tetsuo Ikeyama, Yaita (JP); Akira Koike, Yaita (JP)

(73) Assignee: Sharp Kabushiki Kaisha, Osaka (JP)

( * ) Notice: Subject to any disclaimer, the term of this patent is extended or adjusted under 35 U.S.C. 154(b) by 443 days.

(21) Appl. No.: 12/318,804

(22) Filed: Jan. 8, 2009

(65) Prior Publication Data

US 2009/0174791 A1 Jul. 9, 2009

(30) Foreign Application Priority Data

Jan. 9, 2008 (JP) ................ 2008-002593

(51) Int. Cl.
H04N 9/73 (2006.01)
(52) U.S. Cl. ................................... 348/223.1
(58) Field of Classification Search ............ 348/223.1, 348/231.99; 382/167, 164; 345/88; 358/516
See application file for complete search history.

(56) References Cited

U.S. PATENT DOCUMENTS

| | | | |
|---|---|---|---|
| 6,072,526 A * | 6/2000 | Hashimoto et al. ........ | 348/223.1 |
| 6,650,365 B1 | 11/2003 | Sato | |
| 6,744,920 B1 | 6/2004 | Sakaida | |
| 2004/0012694 A1 | 1/2004 | Sato | |
| 2004/0126012 A1 * | 7/2004 | Sakaida ................. | 382/167 |
| 2007/0115232 A1 | 5/2007 | Urisu | |
| 2008/0166042 A1 | 7/2008 | Pan et al. | |

FOREIGN PATENT DOCUMENTS

| | | |
|---|---|---|
| CN | 1976481 A | 6/2007 |
| EP | 1 599 052 A2 | 11/2005 |
| JP | 10-285541 A | 10/1998 |
| JP | 2000-20013 | 1/2000 |
| JP | 2001-103504 | 4/2001 |
| JP | 2001-128191 | 5/2001 |
| JP | 2002-315015 | 10/2002 |
| JP | 2006-237798 A | 9/2006 |
| JP | 2007-142983 A | 6/2007 |
| JP | 2007-150480 | 6/2007 |

OTHER PUBLICATIONS

Yukio Okano et al., Color Reproduction Characteristics of Liquid Crystal Display Panels and New Compensation Methods for Them, Sharp Technical Journal, vol. 3, Aug. 2001, XP002613876.

* cited by examiner

*Primary Examiner* — David Ometz
*Assistant Examiner* — Akshay Trehan
(74) *Attorney, Agent, or Firm* — Birch, Stewart, Kolasch & Birch, LLP

(57) ABSTRACT

A correction signal capturing section of a skin color correction processing section of an image processor captures WB-corrected $R_1G_1B_1$ signal values, a WB inverse correction section performs inverse correction, a YCbCr conversion section converts obtained $R_2G_2B_2$ signal values into $Y_1Cb_1Cr_1$ signal values. A skin color pixel region detection section detects pixels corresponding to skin color pixel regions, a skin color correction section performs skin color correction to the $Y_1Cb_1Cr_1$ signal values and obtains $Y_2Cb_2Cr_2$ signal values, and a RGB conversion section converts the obtained $Y_2Cb_2Cr_2$ signal values into $R_3G_3B_3$ signal values. A WB correction section performs WB correction to the $R_3G_3B_3$ signal values and obtains $R_4G_4B_4$ signal values. An output section outputs the image signals of the image reconstructed by applying said $R_4G_4B_4$ signal values to the skin color pixel regions and by applying said $R_1G_1B_1$ signal values to the pixel regions other than the skin color pixel regions.

4 Claims, 7 Drawing Sheets

(2 of 7 Drawing Sheet(s) Filed in Color)

IMAGE PROCESSOR, IMAGE PROCESSING METHOD AND RECORDING MEDIUM

CROSS-REFERENCE TO RELATED APPLICATIONS

This Nonprofisional application claims priority under 35 U.S.C. §119(a) on Patent Application No. 2008-2593 filed in Japan on Jan. 9, 2008, the entire contents of which are hereby incorporated by reference.

BACKGROUND

1. Technical Field

The present invention relates to an image processor and an image processing method for performing skin color correction to captured RGB signals without adversely affecting white balance and for outputting an obtained image to a display device, and to a recording medium for storing a program for executing the image processing.

2. Description of Related Art

In recent years, plentiful image processors for detecting skin color regions (skin color pixel regions) in an image on the basis of captured image signal values and correcting the skin color in the skin color pixel regions on the basis of user instructions have been proposed. The method for correcting the skin color has been disclosed in Japanese Patent Application Laid-Open No. 2006-237798, for example.

A type of skin color correction processor, provided for an image processor, captures RGB signals of the three primary color signals of an image subjected to white balance (hereafter referred to as WB) correction and performs skin color correction processing on the basis of the RGB signals. The WB correction is defined as processing for adjusting WB by changing the mixture ratio of RGB signal values to be output to 1.1:0.9:1.0, for example, instead of 1:1:1. The method for the WB correction is disclosed in Japanese Patent Application Laid-Open No. 2007-142983, for example.

FIG. 1 is a block diagram showing the configuration of a conventional skin color correction processor 30.

The skin color correction processor 30 comprises a correction signal capturing section 31, a YCbCr conversion section 32, a skin color pixel regions detection section 33, a skin color correction section 34, a RGB conversion section 35 and an output section 36.

$R_1 G_1 B_1$ signal values of three primary color signals that are WB-corrected using a lookup table (hereafter referred to as LUT) are input from a tuner (not shown) to the correction signal capturing section 31 of the skin color correction processor 30. The correction signal capturing section 31 outputs the $R_1 G_1 B_1$ signal values to the YCbCr conversion section 32 and the output section 36.

The YCbCr conversion section 32 converts the $R_1 G_1 B_1$ signal values into $Y_1 Cb_1 Cr_1$ signal values of component signals using a matrix (hereafter referred to as RGB-YCbCr matrix) for converting RGB signal values into YCbCr signal values on the basis of the ITU-RBT.709 standard as shown in Expression (1) described below. The YCbCr conversion section 32 outputs the obtained $Y_1 Cb_1 Cr_1$ signal values to the skin color pixel region detection section 33 and the skin color correction section 34.

[Expression 1]

$$\begin{pmatrix} Y_1 \\ Cb_1 \\ Cr_1 \end{pmatrix} = \begin{pmatrix} 0.2126 & 0.7152 & 0.072 \\ -0.1146 & -0.3854 & 0.5 \\ 0.5 & -0.4542 & -0.0458 \end{pmatrix} \begin{pmatrix} R_1 \\ G_1 \\ B_1 \end{pmatrix} \quad (1)$$

The skin color pixel region detection section 33 detects a skin color pixel regions on the basis of the $Y_1 Cb_1 Cr_1$ signal values.

The skin color correction section 34 performs color conversion for the $Y_1 Cb_1 Cr_1$ signal values according to Expression (2) described below on the basis of the coefficients of saturation s, hue θ and brightness L set by the user and obtains $Y_2 Cb_2 Cr_2$ signal values of the component signals. Then, the skin color correction section 34 outputs the obtained $Y_2 Cb_2 Cr_2$ signal values to the RGB conversion section 35.

[Expression 2]

$$\begin{pmatrix} Y_2 \\ Cb_2 \\ Cr_2 \end{pmatrix} = \begin{pmatrix} L & 0 & 0 \\ 0 & s\cos\theta & -s\sin\theta \\ 0 & s\sin\theta & s\cos\theta \end{pmatrix} \begin{pmatrix} Y_1 \\ Cb_1 \\ Cr_1 \end{pmatrix} \quad (2)$$

Then, the RGB conversion section 35 converts the $Y_2 Cb_2 Cr_2$ signal values into $R_2 G_2 B_2$ signal values of the three primary color signals using a matrix (hereafter referred to as YCbCr-RGB matrix) for converting YCbCr signal values into RGB signal values on the basis of the ITU-RBT.709 standard as shown in Expression (3) described below and outputs the obtained signal values to the output section 36.

[Expression 3]

$$\begin{pmatrix} R_2 \\ G_2 \\ B_2 \end{pmatrix} = \begin{pmatrix} 1 & 0 & 1.5748 \\ 1 & -0.1873 & -0.4681 \\ 1 & 1.8556 & 0 \end{pmatrix} \begin{pmatrix} Y_2 \\ Cb_2 \\ Cr_2 \end{pmatrix} \quad (3)$$

The conversions from the $R_1 G_1 B_1$ signal values to the $R_2 G_2 B_2$ signal values according to Expressions (1) to (3) described above are combined into one conversion represented by Expression (4) described below.

[Expression 4]

$$\begin{pmatrix} R_2 \\ G_2 \\ B_2 \end{pmatrix} = \begin{pmatrix} 1 & 0 & 1.5748 \\ 1 & -0.1873 & -0.4681 \\ 1 & 1.8556 & 0 \end{pmatrix}$$
$$\begin{pmatrix} L & 0 & 0 \\ 0 & s\cos\theta & -s\sin\theta \\ 0 & s\sin\theta & s\cos\theta \end{pmatrix} \begin{pmatrix} 0.2126 & 0.7152 & 0.072 \\ -0.1146 & -0.3854 & 0.5 \\ 0.5 & -0.4542 & -0.0458 \end{pmatrix} \begin{pmatrix} R_1 \\ G_1 \\ B_1 \end{pmatrix} \quad (4)$$

The output section 36 reconstructs the image signals by applying the $R_2 G_2 B_2$ signal values to the skin color pixel regions and by applying the $R_1 G_1 B_1$ signal values to pixel regions other than the skin color pixel regions and outputs the image signals thus reconstructed to a display device (not shown), such as an LCD (liquid crystal display) display.

SUMMARY

In the conventional skin color correction processor 30, the signal values of all the components $R_2$, $G_2$ and $B_2$ output from the RGB conversion section 35 become equal occasionally depending on the selection of the coefficients s, θ and L in Expression (4) described above.

For example, when s=0, θ=0 and L=1 in Expression (4) described above, Expression (4) is represented by Expression, (5) described below, and all the signal values $R_2$, $G_2$ and $B_2$ become equal.

[Expression 5]

$$\begin{pmatrix} R_2 \\ G_2 \\ B_2 \end{pmatrix} = \begin{pmatrix} 0.2126 & 0.7152 & 0.072 \\ 0.2126 & 0.7152 & 0.072 \\ 0.2126 & 0.7152 & 0.072 \end{pmatrix} \begin{pmatrix} R_1 \\ G_1 \\ B_1 \end{pmatrix} \quad (5)$$

Essentially, the mixture ratio of the RGB signal values is changed depending on the panel characteristics, light source characteristics, etc. to display white having a same color temperature. However, in the conventional skin color correction processor 30, the results of the WB correction and the skin color correction fails to be reflected occasionally as described above, and there is a problem that skin color excellent in quality cannot be reproduced.

In consideration of these circumstances, the present invention is intended to provide an image processor and an image processing method capable of reproducing skin color excellent in quality because inverse correction is performed for WB-corrected image signal values, skin color correction is further performed, and then WB correction is performed, so that skin color is detected accurately and corrected while the effect of the WB correction is eliminated, and then WB is adjusted securely. The present invention is also intended to provide a recording medium for storing a program for executing the image processing.

An image processor according to a first aspect of the present invention comprises a signal capturing section for capturing image signals converted from an image, a skin color pixel region detection section for detecting skin color pixel regions in the image on the basis of the captured image signal values, a skin color correction section for performing skin color correction to the captured image signal values to obtain skin color correction signal values, and an output section for outputting the image signals of the image reconstructed by applying the skin color correction signal values to the detected skin color pixel regions and by applying the captured image signal values before the skin color correction to pixel regions other than the skin color pixel regions, the image processor being characterized by that a white balance correction section for performing white balance correction to the skin color correction signal values is provided.

The image processor according to a second aspect of the present invention which is based on the first aspect of the invention is characterized by that the captured image signal values are $R_1G_1B_1$ signal values of three primary color signals subjected to white balance correction beforehand; that the image processor has an inverse correction section for performing inverse correction to the $R_1G_1B_1$ signal values to obtain $R_2G_2B_2$ signal values, and a YCbCr conversion section for converting the $R_2G_2B_2$ signal values into $Y_1Cb_1Cr_1$ signal values of component signals; that the skin color region detection section detects the skin color pixel regions on the basis of the $Y_1Cb_1Cr_1$ signal values; that the skin color correction section performs the skin color correction to the $Y_1Cb_1Cr_1$ signal values to obtain $Y_2Cb_2Cr_2$ signal values; that the image processor has a RGB conversion section for converting the $Y_2Cb_2Cr_2$ signal values into $R_3G_3B_3$ signal values; that the white balance correction section performs white balance correction to the $R_3G_3B_3$ signal values to obtain $R_4G_4B_4$ signal values; and that the output section reconstructs the image by applying the $R_4G_4B_4$ signal values to the skin color pixel regions and by applying the $R_1G_1B_1$ signal values to the pixel regions other than the skin color pixel regions and outputs the image signal of the reconstructed image.

The image processor according to a third aspect of the present invention which is based on the second aspect of the invention is characterized by that the inverse correction section and the white balance correction section perform correction using a lookup table.

An image processing method according to a forth aspect of the present invention comprises a step of capturing image signals converted from an image, a judgment step of judging whether the captured image signal values are signal values representing skin color pixel regions in the image, a skin color correction step of calculating skin color correction signal values in the case that it has been judged that the captured image signal values are signal values representing the skin color pixel regions; and a reconstruction step of reconstructing the image by applying the skin color correction signal values to the skin color pixel regions and by applying the captured image signal values to which the skin color correction is not performed to pixel regions other than the skin color pixel regions, the image processing method being characterized by that a first white balance correction step of performing white balance correction to the skin color correction signal values is provided.

The image processing method according to a fifth aspect of the present invention which is based on the forth aspect of the invention is characterized by that the image signal values are $R_1G_1B_1$ signal values of three primary color signals subjected to white balance correction beforehand; that the image processing method has an inverse correction step of performing inverse correction to the $R_1G_1B_1$ signal values to obtain $R_2G_2B_2$ signal values and a step of converting the $R_2G_2B_2$ signal values into $Y_1Cb_1Cr_1$ signal values of component signals; that the judgment step judges whether the $Y_1Cb_1Cr_1$ signal values are signal values representing the skin color pixel regions; that the skin color correction step performs skin color correction to the $Y_1Cb_1Cr_1$ signal values to obtain $Y_2Cb_2Cr_2$ signal values in the case that the judgment step has judged that the $Y_1Cb_1Cr_1$ signal values are signal values representing the skin color pixel regions; that the image processing method has a step of converting the $Y_2Cb_2Cr_2$ signal values into $R_3G_3B_3$ signal values, a step of converting the $Y_1Cb_1Cr_1$ signal values into $R_2G_2B_2$ signal values in the case that the judgment step has judged that the $Y_1Cb_1Cr_1$ signal values are not signal values representing the skin color pixel regions, and a second white balance correction step of performing white balance correction to the $R_2G_2B_2$ signal values to obtain $R_1G_1B_1$ signal values; that the first white balance correction step performs the white balance correction to the $R_3G_3B_3$ signal values to obtain $R_4G_4B_4$ signal values; and that the reconstruction step reconstructs the image by applying the $R_4G_4B_4$ signal values to the skin color pixel regions and by applying the $R_1G_1B_1$ signal values to the pixel regions other than the skin color pixel regions.

The image processing method according to a sixth aspect of the present invention which is based on the fifth aspect of the invention is characterized by that the inverse correction step, the first white balance correction step and the second white balance correction step perform correction using a lookup table.

A recording medium according to a seventh aspect of the present invention is a computer readable recording medium on which a computer program is recorded, the computer program comprising a judgment step of causing a computer to judge whether captured image signal values converted from an image are signal values representing skin color pixel regions, a skin color correction step of causing the computer to calculate skin color correction signal values in the case that it has been judged that the captured image signal values are signal values representing the skin color pixel regions, and a reconstruction step of causing the computer to reconstruct the image by applying the skin color correction signal values to the skin color pixel regions and by applying the captured image signal values to which skin color correction is not performed to pixel regions other than the skin color pixel regions, the computer program being characterized by that a first white balance correction step of causing the computer to perform white balance correction to the skin color correction signal values is provided.

The recording medium according to a eighth aspect of the present invention which is based on the seventh aspect of the invention is characterized by that the captured image signal values are $R_1G_1B_1$ signal values of three primary color signals subjected to white balance correction beforehand; that the computer program has an inverse correction step of causing the computer to perform inverse correction to the $R_1G_1B_1$ signal values to obtain $R_2G_2B_2$ signal values and a step of causing the computer to convert the $R_2G_2B_2$ signal values into $Y_1Cb_1Cr_1$ signal values of component signals; that the judgment step causes the computer to judge whether the $Y_1Cb_1Cr_1$ signal values are signal values representing the skin color pixel regions; that the skin color correction step causes the computer to perform skin color correction to the $Y_1Cb_1Cr_1$ signal values to obtain $Y_2Cb_2Cr_2$ signal values in the case that the judgment step has judged that the $Y_1Cb_1Cr_1$ signal values are signal values representing the skin color pixel regions; that the computer program has a step of causing the computer to convert the $Y_2Cb_2Cr_2$ signal values into $R_3G_3B_3$ signal values, a step of causing the computer to convert the $Y_1Cb_1Cr_1$ signal values into $R_2G_2B_2$ signal values in the case that the judgment step has judged that the $Y_1Cb_1Cr_1$ signal values are not signal values representing the skin color pixel regions, and a second white balance correction step of causing the computer to perform white balance correction to the $R_2G_2B_2$ signal values to obtain $R_1G_1B_1$ signal values; that the first white balance correction step causes the computer to perform the white balance correction to the $R_3G_3B_3$ signal values to obtain $R_4G_4B_4$ signal values; and that the reconstruction step causes the computer to reconstruct the image by applying the $R_4G_4B_4$ signal values to the skin color pixel regions and by applying the $R_1G_1B_1$ signal values to the pixel regions other than the skin color pixel regions.

The recording medium according to a ninth aspect of the present invention which is based on the eighth aspect of the invention is characterized by that the inverse correction step, the first white balance correction step and the second white balance correction step cause the computer to perform correction using a lookup table.

With the aspects of the present invention, since the WB correction is performed after the skin color correction, even when all the R, G and B signal values become equal after the skin color correction, it is possible to securely adjust WB by varying the signal values. Furthermore, in the case that the WB-corrected image signal values are to be captured, the image signal values are subjected to inverse correction, and then subjected to skin color correction and WB correction. Hence, the skin color can be detected accurately and corrected, whereby excessive WB correction is suppressed. Hence, it is possible to reproduce skin color being excellent in quality.

Moreover, with the aspects of the present invention, since the WB correction is performed using a LUT, setting can be performed independently of the input values of R, G and B, whereby the WB correction can be performed elaborately. Since the LUT is also used for the inverse correction of WB, the image signal values can be restored easily to their original values.

The above and further objects and features will more fully be apparent from the following detailed description with accompanying drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the office upon request and payment of the necessary fee.

DETAILED DESCRIPTION

Embodiments according to the present invention will be described below specifically on the basis of the drawings.

Embodiment 1

Figure 1:
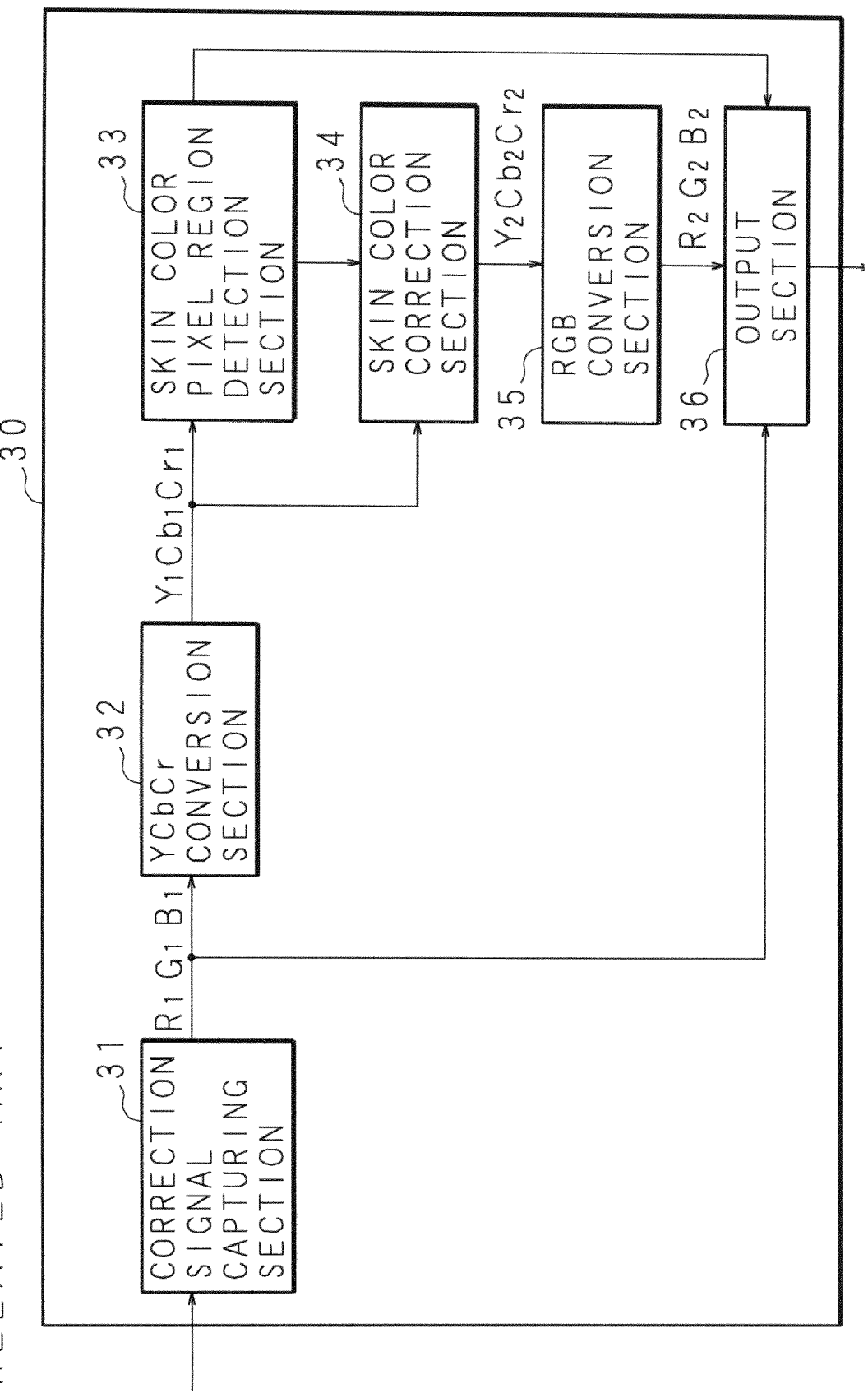
FIG. 1 is a block diagram showing the configuration of a conventional skin color correction processor.
Figure 2:
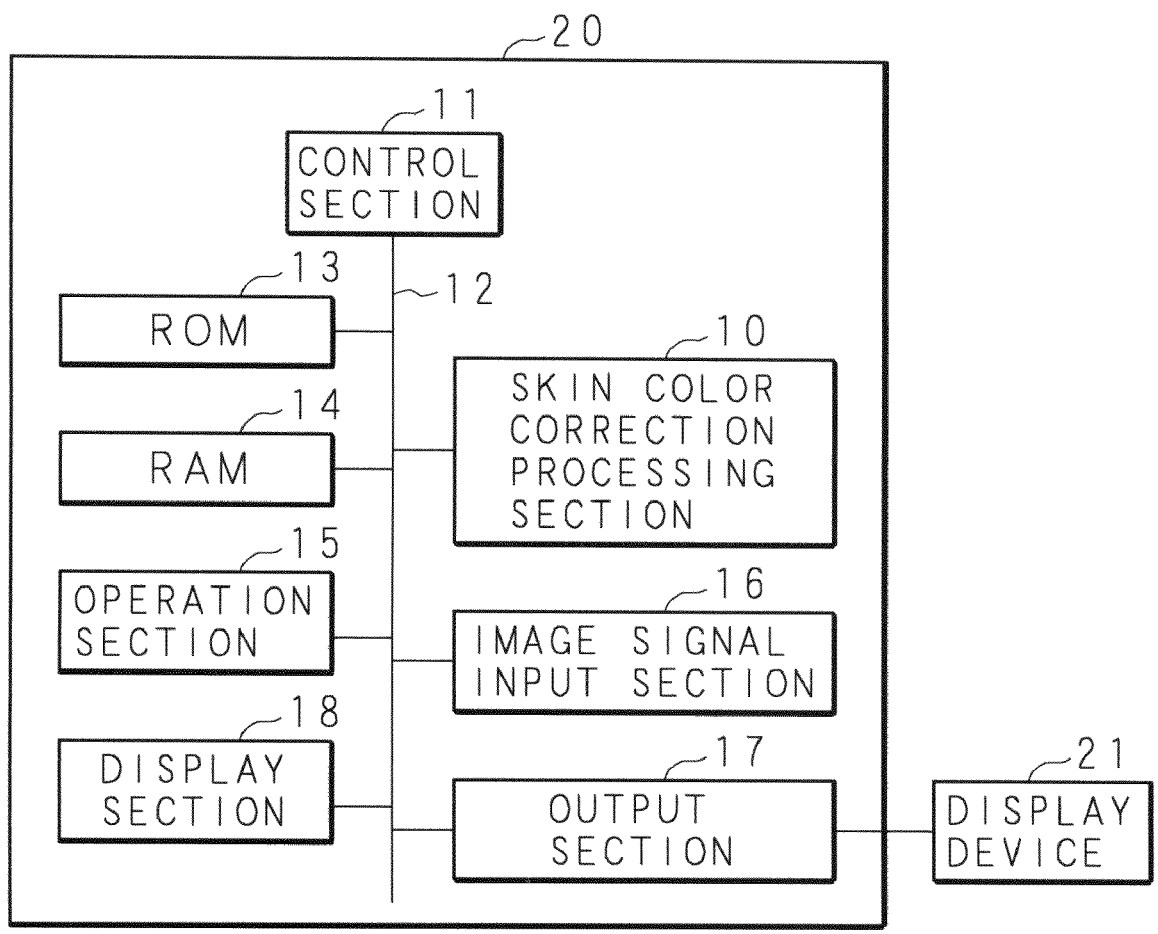
FIG. 2 is a block diagram showing the configuration of an image processor according to Embodiment 1.

FIG. 2 is a block diagram showing the configuration of an image processor 20 according to Embodiment 1.

The image processor 20 is equipped with a control section 11 composed of a CPU or the like. The control section 11 is connected to a skin color correction processing section 10, a ROM 13, a RAM 14, an operation section 15, an image signal input section 16, an output section 17 and a display section 18 via a system bus 12. The control section 11 controls these sections and executes various processing according to control programs stored in the ROM 13.

Various control programs and the like required for operating the image processor 20 are stored beforehand in the ROM 13 as described above. The RAM 14 is composed of a SRAM, a flash memory or the like and temporarily stores data generated when control programs are executed using the control section 11.

The operation section 15 is equipped with various function keys for a user to operate the image processor 20. When a key is operated by the user, the control signal corresponding to the operated key is transmitted to the control section 11. The control section 11 sets coefficients, such as saturation s, hue θ and brightness L, corresponding to the captured control signal and also sets LUT.

The display section 18 consists of a display device, such as a liquid crystal monitor or an LED monitor. The display section 18 displays the operation states of the image processor 20 and various information input via the operation section 15 and a remote controller (not shown).

The image signal input section 16 is connected to an antenna (not shown) disposed facing toward a broadcast relay station, for example. The image signal input section 16 consists of a tuner that selects an image signal of a specific frequency band from among image signals transmitted from the broadcast relay station and demodulates the image signal, or consists of a tuner conforming to satellite broadcasting, cable television broadcasting or the like. Furthermore, the image signal input section 16 may be configured to be connected to the external tuner of an apparatus for playing back video tapes, DVDs, etc. and to input an image signal from the external tuner.

The image signal input section 16 is configured to perform WB correction to input image signal values using the LUT having been set at the time of factory shipment or the like and to output the $R_1G_1B_1$ signal values of the obtained three primary color signals to the skin color correction processing section 10.

Table 1 shown below shows the above-mentioned LUT. In the case that YCrCb signals of the component signals are input to the image signal input section 16, the signals are converted into RGB signals and subjected to the above-mentioned correction.

TABLE 1

| INPUT VALUE | R OUTPUT VALUE | G OUTPUT VALUE | B OUTPUT VALUE |
|---|---|---|---|
| 0 | 0 | 0 | 0 |
| 1 | 1 | 1 | 1 |
| 2 | 2 | 2 | 2 |
| 3 | 3 | 3 | 3 |
| . | . | . | . |
| . | . | . | . |
| . | . | . | . |
| 250 | 248 | 250 | 242 |
| 251 | 249 | 251 | 242 |
| 252 | 250 | 252 | 243 |
| 253 | 251 | 253 | 244 |
| 254 | 252 | 254 | 244 |
| 255 | 253 | 255 | 245 |

The brightness value of each element of the RGB signals is represented by a value ranging from 0 to 255 in the case of 8-bit values.

For example, when the input value of R is "250", the output value is set at "248"; when the input value of G is "250", the output value is set at "250"; and when the input value of B is "250", the output value is set at "242" using the LUT of Table 1. With this adjustment of the mixture ratio of the respective elements of the RGB signals, it is intended that white having the same color temperature can be displayed if the image signals are the same even if there are differences in the panel characteristics, light source characteristics, etc. of a display device 21.

The skin color correction processing section 10, consisting of an IC chip, corrects the $R_1G_1B_1$ signal values captured from the image signal input section 16 as described later and outputs the corrected signal values to the output section 17.

The output section 17 is connected to the display device 21, such as a liquid crystal display or a CRT display, via a video cable or an audio cable (both are not shown), performs processing for displaying image signals transmitted from the skin color correction processing section 10 and displays an image based on the processed image signals on the display device 21.

Figure 3:
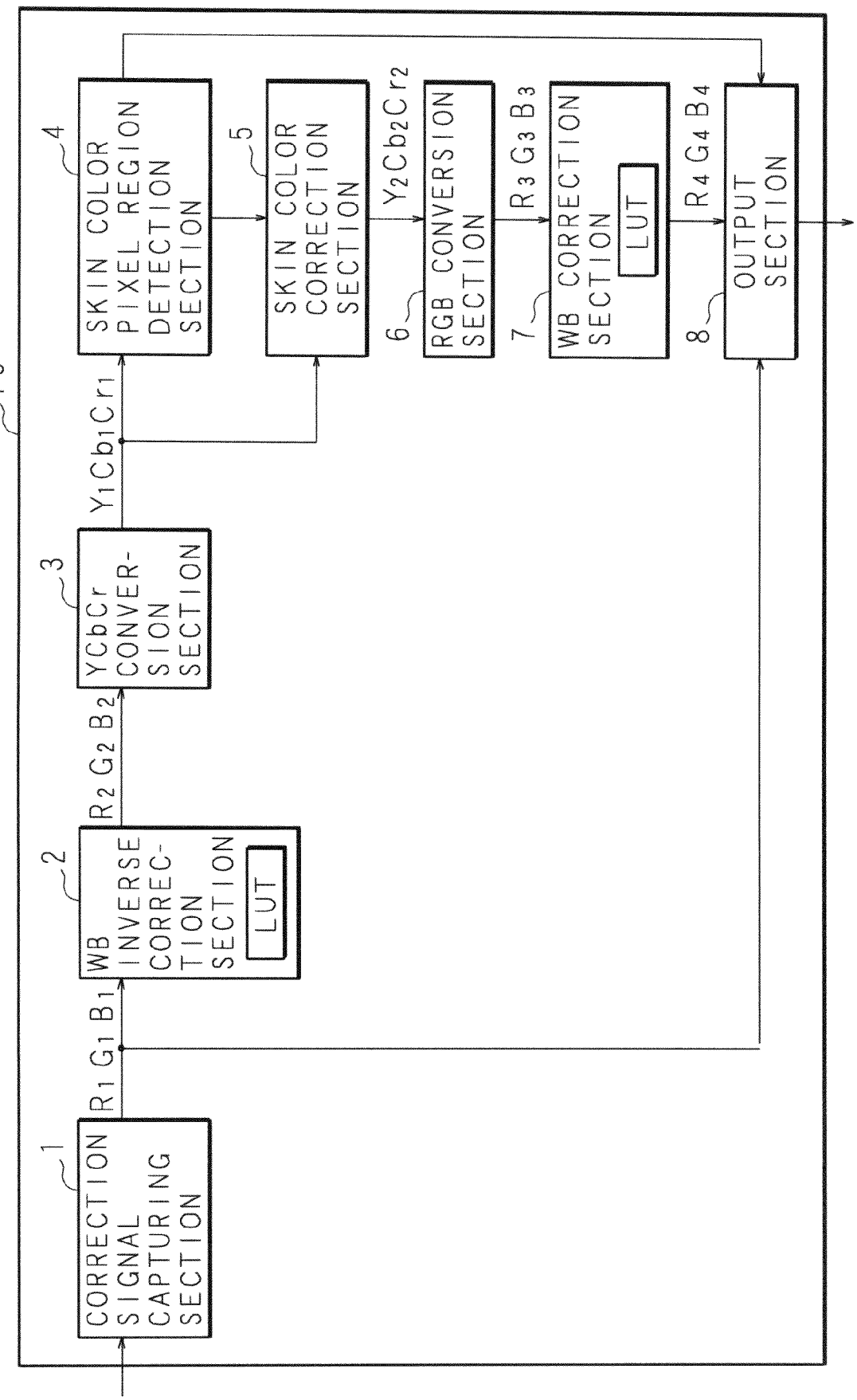
FIG. 3 is a block diagram showing the configuration of a skin color correction processing section according to Embodiment 1.

FIG. 3 is a block diagram showing the configuration of the skin color correction processing section 10.

The skin color correction processing section 10 comprises a correction signal capturing section (signal capturing section) 1, a WB inverse correction section (inverse correction section) 2, a YCbCr conversion section 3, a skin color pixel region detection section 4, a skin color correction section 5, a RGB conversion section 6, a WB correction section 7 and an output section 8.

$R_1G_1B_1$ signal values are input from the image signal input section 16 to the correction signal capturing section 1 as described above.

The correction signal capturing section 1 outputs the $R_1G_1B_1$ signal values to the WB inverse correction section 2 and the output section 8.

The $R_1G_1B_1$ signal values, subjected to WB correction, are inversely corrected by the WB inverse correction section 2, and $R_2G_2B_2$ signal values of three primary color signals are obtained. At this time, for example, when the input value of R (corresponding to the "R output value" column in Table 1) is "248", the output value (corresponding to the "input value" column in Table 1) is set at "250"; when the input value of G is "250", the output value is set at "250"; and when the input value of B is "242", the output value is set at "250" using the LUT of Table 1 described above. Hence, the mixture ratio of the RGB signal values becomes 1:1:1.

The YCbCr conversion section 3 converts the $R_2G_2B_2$ signal values of three primary color signals into the $Y_1Cb_1Cr_1$ signal values of the component signals using the above-mentioned RGB-YCbCr matrix according to Expression (6) described below and outputs the $Y_1Cb_1Cr_1$ signal values obtained through the conversion to the skin color pixel region detection section 4 and the skin color correction section 5. The standard for the conversion is not limited to the ITU-RBT.709 standard.

[Expression 6]

$$\begin{pmatrix} Y_1 \\ Cb_1 \\ Cr_1 \end{pmatrix} = \begin{pmatrix} 0.2126 & 0.7152 & 0.072 \\ -0.1146 & -0.3854 & 0.5 \\ 0.5 & -0.4542 & -0.0458 \end{pmatrix} \begin{pmatrix} R_2 \\ G_2 \\ B_2 \end{pmatrix} \quad (6)$$

The skin color pixel region detection section 4 detects pixels corresponding to the skin color pixel regions on the basis of the $Y_1Cb_1Cr_1$ signal values. The skin color pixel region detection section 4 detects the pixels on the basis of the brightness values. Furthermore, the skin color pixel region detection section 4 outputs, to the output section 8, information regarding pixels corresponding to the skin color pixel regions and information regarding pixels not corresponding to the skin color pixel regions.

The skin color correction section 5 performs color conversion (skin color correction) to the $Y_1Cb_1Cr_1$ signal values according to Expression (2) described above on the basis of the coefficients of saturation s, hue θ and brightness L set by the user as described above to obtain the $Y_2Cb_2Cr_2$ signal values of component signals. Then, the skin color correction section 5 outputs the obtained the $Y_2Cb_2Cr_2$ signal values to the RGB conversion section 6.

The RGB conversion section 6 converts the $Y_2Cb_2Cr_2$ signal values into $R_3G_3B_3$ signal values of three primary color signals using the above-mentioned YCbCr-RGB matrix according to Expression (7) described below and outputs the $R_3G_3B_3$ signal values to the WB correction section 7.

[Expression 7]

$$\begin{pmatrix} R_3 \\ G_3 \\ B_3 \end{pmatrix} = \begin{pmatrix} 1 & 0 & 1.5748 \\ 1 & -0.1873 & -0.4681 \\ 1 & 1.8556 & 0 \end{pmatrix} \begin{pmatrix} Y_2 \\ Cb_2 \\ Cr_2 \end{pmatrix} \quad (7)$$

The WB correction section 7 performs WB correction to the $R_3G_3B_3$ signal values using the LUT of Table 1 described above to obtain $R_4G_4B_4$ signal values of three primary color signals. Then, the WB correction section 7 outputs the obtained $R_4G_4B_4$ signal values to the output section 8.

In the WB correction section 7, for example, when the input value of R is "250", the output value is set at "248"; when the input value of G is "252", the output value is set at "252"; and when the input value of B is "251", the output value is set at "242" using the LUT of Table 1 described above.

At this time, the LUT shown in Table 2 which is created by using adjustment values that are inputted by the user through the operation section 15 may also be used instead of the LUT of Table 1 applied to WB correction at the time of factory shipment or the like.

TABLE 2

| INPUT VALUE | R OUTPUT VALUE | G OUTPUT VALUE | B OUTPUT VALUE |
|---|---|---|---|
| 0 | 0 | 0 | 0 |
| 1 | 1 | 1 | 1 |
| 2 | 2 | 2 | 2 |
| 3 | 3 | 3 | 3 |
| . | . | . | . |
| . | . | . | . |
| . | . | . | . |
| 250 | 248 | 237 | 242 |
| 251 | 249 | 238 | 242 |
| 252 | 250 | 238 | 243 |
| 253 | 251 | 239 | 244 |
| 254 | 252 | 239 | 244 |
| 255 | 253 | 240 | 245 |

For example, when the input value of R is "250", the output value is set at "248"; when the input value of G is "252", the output value is set at "238"; and when the input value of B is "251", the output value is set at "242" using the LUT of Table 2. Hence, WB is adjusted so as to suit the preference of the user.

The output section 8 reconstructs a frame (image) and outputs the frame to the output section 17. In other words, the output section 8 reconstructs the image by applying the $R_4G_4B_4$ signal values to the pixels corresponding to the skin color pixel regions among the pixels forming the entire frame and by applying the $R_1G_1B_1$ signals to the pixels not corresponding to the skin color pixel regions, and outputs the image signals of the reconstructed image to the output section 17.

Figure 4:
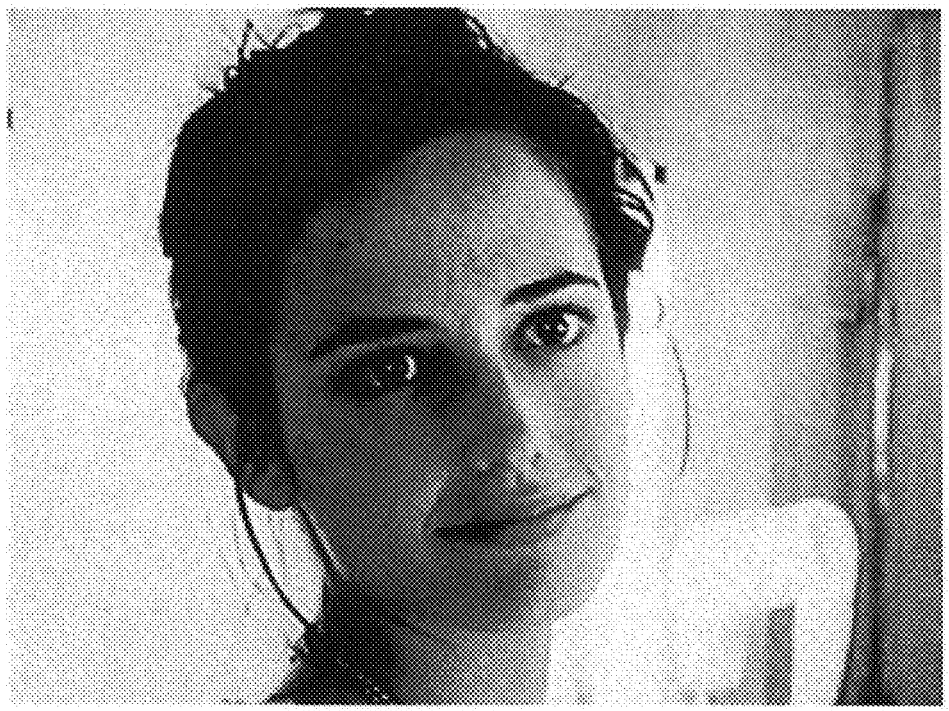
FIG. 4 is a photograph showing one frame in the case that skin color correction is performed using the skin color correction processing section according to Embodiment 1 and the result of the correction is displayed on a display device.
Figure 5:
FIG. 5 is a photograph showing one frame in the case that skin color correction is performed using the conventional skin color correction processor and the result of the correction is displayed on the display device.

FIG. 4 is a photograph showing one frame in the case that skin color correction is performed using the skin color correction processing section 10 and the result of the correction is displayed on the display device 21, and FIG. 5 is a photograph showing one frame in the case that skin color correction is performed using the conventional skin color correction processor 30 and the result of the correction is displayed on the display device 21.

When the photograph of FIG. 4 is compared with the photograph of FIG. 5, it is found that by performing the inverse correction to the WB-corrected image signal values and performing the skin color correction and then performing the WB correction using the skin color correction processing section 10 according to this embodiment it is possible to reproduce skin color higher in quality than that obtained by performing the skin color correction using the skin color correction processing section 30 without performing inverse correction of WB. In other words, the skin color correction processing section 10 can accurately detect and correct skin color and performs the WB correction after the skin color correction, thereby being capable of securely adjusting WB by making the R, G and B signal values different.

Embodiment 2

Figure 6:
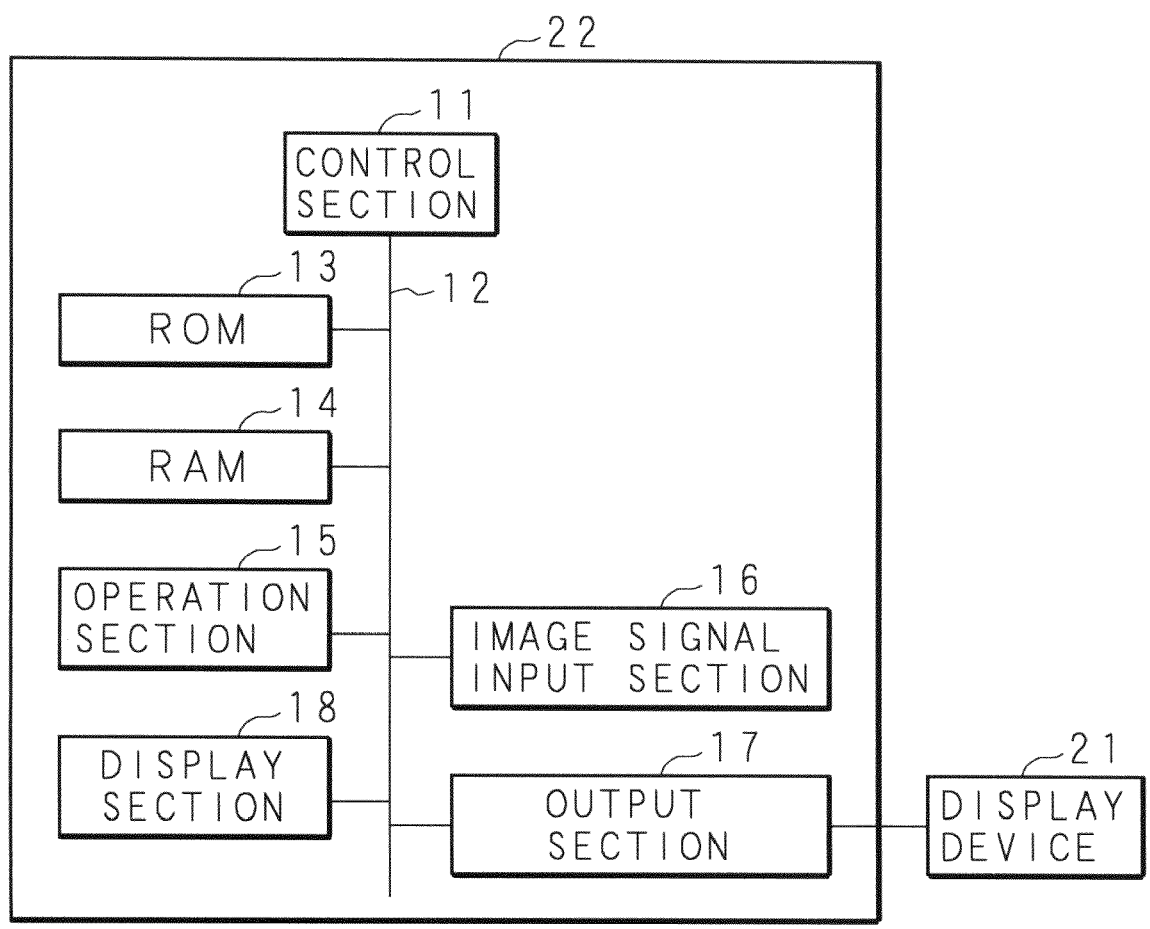
FIG. 6 is a block diagram showing the configuration of an image processor according to Embodiment 2 in which skin color correction processing is performed using a computer program.

FIG. 6 is a block diagram showing the configuration of an image processor 22 according to Embodiment 2 in which the skin color correction processing is executed using a computer program. The same components as those shown in FIG. 2 are designated by the same numerals and their detailed descriptions are omitted.

The image processor 22 is not equipped with the skin color correction processing section 10 of the image processor 20, and a computer program for executing skin color correction processing according to Embodiment 2 is stored in the ROM 13. It may also be possible that a recording medium, such as EEPROM (electrically erasable programmable read only memory) or flash EEPROM, on which the program is recorded is mounted on the image processor 22 and that the program is read from the recording medium and stored in the ROM 13. The control section 11 reads the program stored in the ROM 13 and executes the skin color correction processing according to the program.

Figure 7:
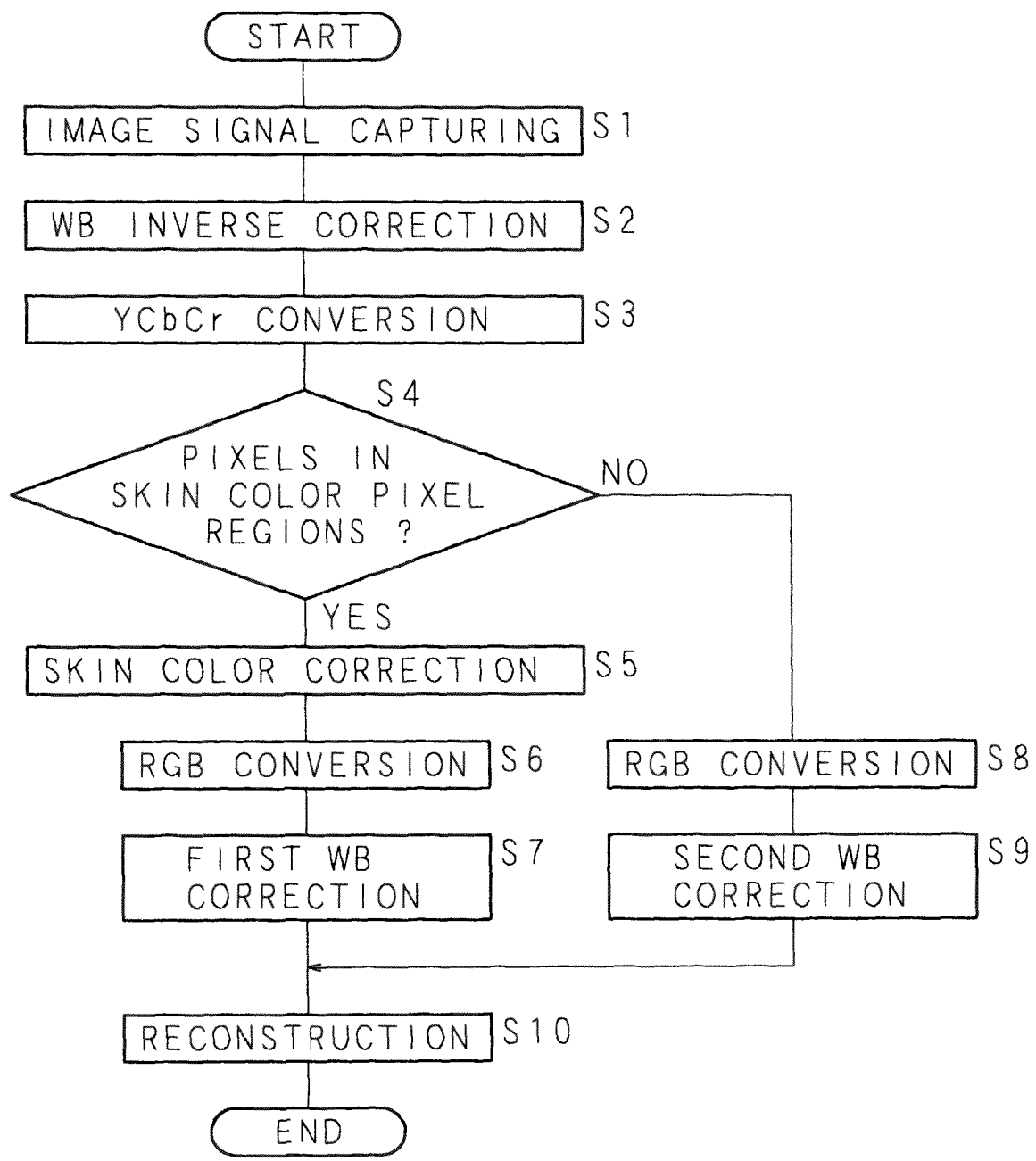
FIG. 7 is a flowchart showing the procedure of the skin color correction processing of the control section of the image processor.

FIG. 7 is a flowchart showing the procedure of the skin color correction processing of the control section 11.

The control section 11 captures the $R_1G_1B_1$ signals of the WB-corrected three primary color signals from the image signal input section 16 (at step S1).

Then, the control section 11 inversely corrects the WB-corrected $R_1G_1B_1$ signal values and obtains $R_2G_2B_2$ signal values (at step S2). At this time, the LUT whose values have been set for WB correction of the image signal input section 16 at the time of factory shipment or the like is used.

The control section 11 converts the $R_2G_2B_2$ signal values into $Y_1Cb_1Cr_1$ signal values of component signals according to Expression (6) described above (at step S3).

Furthermore, the control section 11 judges whether the $Y_1Cb_1Cr_1$ signal values corresponding to pixels of the image are signal values representing the skin color pixel regions (at step S4). The control section 11 makes the judgment on the basis of the brightness value.

In the case that the control section 11 has judged that the $Y_1Cb_1Cr_1$ signal values are not signal values representing the skin color pixel regions (NO at step S4), the control section 11 converts the $Y_1Cb_1Cr_1$ signal values into $R_2G_2B_2$ signal values using the YCbCr-RGB matrix described above (at step S8). Then, the control section 11 performs the second WB correction for the $R_2G_2B_2$ signal values using the LUT of Table 1 described above and obtains $R_1G_1B_1$ signal values (at step S9), and then advances the processing to step S10.

In the case that the control section 11 has judged that the $Y_1Cb_1Cr_1$ signal values are signal values representing the skin color pixel regions (YES at step S4), the control section 11 performs skin color correction for the signal values. In other words, the control section 11 obtains $Y_2Cb_2Cr_2$ signal values according to Expression (2) described above (at step S5). Then, the control section 11 converts the $Y_2Cb_2Cr_2$ signal values into $R_3G_3B_3$ signal values according to Expression (7) described above (at step S6).

Next, the control section 11 performs the first WB correction for the $R_3G_3B_3$ signal values using the LUT of Table 1 or Table 2 described above and obtains $R_4G_4B_4$ signal values (at step S7).

Then, the control section 11 reconstructs the frame and output the frame to the output section 17 (at step S10). In other words, the control section 11 reconstructs the image by applying the $R_4G_4B_4$ signal values to the pixels corresponding to the skin color pixel regions among the pixels forming the entire frame and by applying the $R_1G_1B_1$ signals to the pixels not corresponding to the skin color pixel regions and then outputs the image signals of the reconstructed image to the output section 17.

In this embodiment, inverse correction is performed for the WB-corrected image signal values, the skin color correction is further performed, and then WB correction is performed. Hence, it is possible to accurately detect the skin color pixel regions and to perform the skin color correction. Even if all the R, G and B signal values become equal after the skin color correction, since the WB correction is to be performed thereafter, it is possible to securely adjust the WB by varying the respective signal values.

Hence, it is possible to reproduce the skin color excellent in quality.

Although it is explained that the image signal input section 16 outputs the WB-corrected image signal values to the skin color correction processing section 10 or the control section 11 in Embodiments 1 and 2 described above, the present invention is not limited to this configuration. It may also be possible that the image processor 20 or 22 is equipped with a WB correction processing section for performing WB correction to the input image signal values and that the WB correction processing section outputs the WB-corrected image signal values to the skin color correction processing section 10 or the control section 11.

Furthermore, it may also be possible that the image signal values before the WB correction are output to the skin color correction processing section 10 or the control section 11 and skin color pixel regions are detected, and after that, the signal values of the pixels corresponding to the skin color pixel regions are subjected to the skin color correction and the WB correction and then output to the output section 17, and the signal values of the pixels not corresponding to the skin color pixel regions are subjected to only the WB correction and output to the output section 17.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. An image processing method comprising:
a step of capturing image signals converted from an image;
a judgment step of judging whether the captured image signal values are signal values representing skin color pixel regions in the image;
a skin color correction step of calculating skin color correction signal values in the case that it has been judged that said captured image signal values are signal values representing said skin color pixel regions; and
a reconstruction step of reconstructing the image by applying said skin color correction signal values to said skin color pixel regions and by applying the captured image signal values to which skin color correction is not performed to pixel regions other than said skin color pixel regions,
wherein
a first white balance correction step of performing white balance correction to said skin color correction signal values is provided, and
said image signal values are $R_1G_1B_1$ signal values of three primary color signals subjected to white balance correction beforehand,
said image processing method has:
an inverse correction step of performing inverse correction to said $R_1G_1B_1$ signal values to obtain $R_2G_2B_2$ signal values; and
a step of converting said $R_2G_2B_2$ signal values into $Y_1Cb_1Cr_1$ signal values of component signals,
said judgment step judges whether said $Y_1Cb_1Cr_1$ signal values are signal values representing said skin color pixel regions,
said skin color correction step performs skin color correction to said $Y_1Cb_1Cr_1$ signal values to obtain $Y_2Cb_2Cr_2$ signal values in the case that said judgment step has judged that said $Y_1Cb_1Cr_1$ signal values are signal values representing said skin color pixel regions,
said image processing method has:
a step of converting said $Y_2Cb_2Cr_2$ signal values into $R_3G_3B_3$ signal values;
a step of converting said $Y_1Cb_1Cr_1$ signal values into $R_2G_2B_2$ signal values in the case that said judgment step has judged that said $Y_1Cb_1Cr_1$ signal values are not signal values representing said skin color pixel regions; and
a second white balance correction step of performing white balance correction to said $R_2G_2B_2$ signal values to obtain $R_1G_1B_1$ signal values,
said first white balance correction step performs said white balance correction to said $R_3G_3B_3$ signal values to obtain $R_4G_4B_4$ signal values, and
said reconstruction step reconstructs the image by applying said $R_4G_4B_4$ signal values to said skin color pixel regions and by applying in said $R_1G_1B_1$ signal values to said pixel regions other than said skin color pixel regions.

2. The image processing method according to claim 1, wherein said inverse correction step, said first white balance correction step and said second white balance correction step perform correction using a lookup table.

3. A non-transitory computer readable recording medium on which a computer program is recorded, said computer program comprising:
a judgment step of causing a computer to judge whether captured image signal values of image signals converted from an image are signal values representing skin color pixel regions;

a skin color correction step of causing the computer to calculate skin color correction signal values in the case that it has been judged that said captured image signal values are signal values representing said skin color pixel regions; and a reconstruction step of causing the computer to reconstruct the image by applying said skin color correction signal values to said skin color pixel regions and by applying the captured image signal values to which skin color correction is not performed to pixel regions other than said skin color pixel regions, wherein said computer program has a first white balance correction step of causing the computer to perform white balance correction to said skin color correction signal values, and said captured image signal values are $R_1G_1B_1$ signal values of three primary color signals subjected to white balance correction beforehand, said computer program has:

an inverse correction step of causing the computer to perform inverse correction to said $R_1G_1B_1$ signal values to obtain $R_2G_2B_2$ signal values; and a step of causing the computer to convert said $R_2G_2B_2$ signal values into $Y_1Cb_1Cr_1$ signal values of component signals, said judgment step causes the computer to judge whether said $Y_1Cb_1Cr_1$ signal values are signal values representing said skin color pixel regions, said skin color correction step causes the computer to perform skin color correction to said $Y_1Cb_1Cr_1$ signal values to obtain $Y_2Cb_2Cr_2$ signal values in the case that said judgment step has judged that said $Y_1Cb_1Cr_1$ signal values are signal values representing said skin color pixel regions, said computer program has:

a step causing the computer to convert said $Y_2Cb_2Cr_2$ signal values into $R_3G_3B_3$ signal values;

a step of causing the computer to convert said $Y_1Cb_1Cr_1$ signal values into $R_2G_2B_2$ signal values in the case that said judgment step has judged that said $Y_1Cb_1Cr_1$ signal values are not signal values representing said skin color pixel regions; and a second white balance correction step of causing the computer to perform white balance correction to said $R_2G_2B_2$ signal values to obtain $R_1G_1B_1$ signal values, said first white balance correction step causes the computer to perform said white balance correction to said $R_3G_3B_3$ signal values to obtain $R_4G_4B_4$ signal values, and said reconstruction step causes the computer to reconstruct the image by applying said $R_4G_4B_4$ signal values to said skin color regions and by applying said $R_1G_1B_1$ signal values to said pixel regions other than said skin color pixel regions.

4. The computer readable recording medium according to claim 3, wherein said inverse correction step, said first white balance correction step and said second white balance correction step cause the computer to perform correction using a lookup table.

* * * * *